United States Patent
Jin

(10) Patent No.: US 10,241,368 B2
(45) Date of Patent: Mar. 26, 2019

(54) ARRAY SUBSTRATE AND DISPLAY PANEL

(71) Applicants: Shanghai AVIC OPTO Electronics Co., Ltd., Shanghai (CN); Tianma Micro-Electronics Co., Ltd., Shenzhen (CN)

(72) Inventor: Huijun Jin, Shanghai (CN)

(73) Assignees: Shanghai AVIC OPTO Electronics Co., Ltd., Shanghai (CN); Tianma Micro-Electronics Co., Ltd., Shenzhen (CN)

( * ) Notice: Subject to any disclaimer, the term of this patent is extended or adjusted under 35 U.S.C. 154(b) by 22 days.

(21) Appl. No.: 15/410,183

(22) Filed: Jan. 19, 2017

(65) Prior Publication Data

US 2017/0131608 A1 May 11, 2017

(30) Foreign Application Priority Data

Oct. 18, 2016 (CN) .......................... 2016 1 0908162

(51) Int. Cl.
*G02F 1/1343* (2006.01)
*G02F 1/1339* (2006.01)
(Continued)

(52) U.S. Cl.
CPC ...... *G02F 1/134309* (2013.01); *G02F 1/1368* (2013.01); *G02F 1/13394* (2013.01);
(Continued)

(58) Field of Classification Search
None
See application file for complete search history.

(56) References Cited

U.S. PATENT DOCUMENTS 8,605,238 B2 * 12/2013 Matsui ............. G02F 1/133512
349/106
8,976,328 B2 * 3/2015 Kim ........................ H01L 33/58
349/106

(Continued)

FOREIGN PATENT DOCUMENTS

CN 1949068 A 4/2007
CN 101226331 A 7/2008
(Continued)

*Primary Examiner* — Richard H Kim
(74) *Attorney, Agent, or Firm* — Anova Law Group, PLLC

(57) ABSTRACT

An array substrate and a display panel are provided. The array substrate includes a first substrate, a plurality of scanning lines and a plurality of data lines disposed on a first side of the first substrate and being intersected to define a plurality of sub-pixels including first, second, third, and fourth sub-pixels arranged alternatingly and repeatedly along a row direction, and a plurality of support structures disposed on the first side of the first substrate. Along a column direction, the plurality of sub-pixels are divided into first sub-pixel columns containing the first and third sub-pixels arranged alternatingly, and second sub-pixel columns containing the second and fourth sub-pixels arranged alternatingly. A projection of a region where the fourth sub-pixel is located on the first substrate covers a projection of a support structure on the first substrate, and the row direction is different from the column direction.

20 Claims, 12 Drawing Sheets

(51) Int. Cl.
   *G02F 1/1362* (2006.01)
   *G02F 1/1368* (2006.01)
   *G09G 3/36* (2006.01)

(52) U.S. Cl.
   CPC ..... *G02F 1/136209* (2013.01); *G09G 3/3607* (2013.01); *G09G 3/3648* (2013.01); *G02F 1/136286* (2013.01); *G02F 2001/134345* (2013.01); *G02F 2001/136222* (2013.01); *G02F 2201/121* (2013.01); *G02F 2201/123* (2013.01); *G02F 2201/40* (2013.01); *G02F 2201/52* (2013.01); *G09G 2300/0434* (2013.01); *G09G 2300/0452* (2013.01); *G09G 2300/0465* (2013.01); *G09G 2320/0233* (2013.01)

(56) References Cited

U.S. PATENT DOCUMENTS

| | | | |
|---|---|---|---|
| 2005/0134763 | A1 | 6/2005 | Kang et al. |
| 2008/0088754 | A1 | 4/2008 | Hu et al. |
| 2016/0155401 | A1 | 6/2016 | Lee et al. |
| 2016/0209718 | A1* | 7/2016 | Lee .................. G02F 1/136227 |
| 2016/0233234 | A1* | 8/2016 | Yang ................ G02F 1/136286 |

FOREIGN PATENT DOCUMENTS

| | | |
|---|---|---|
| CN | 103487994 A | 1/2014 |
| CN | 103903543 A | 7/2014 |
| CN | 104991372 A | 10/2015 |

\* cited by examiner

ARRAY SUBSTRATE AND DISPLAY PANEL

CROSS-REFERENCES TO RELATED APPLICATIONS

This application claims priority of Chinese Patent Application No. 201610908162.4, filed on Oct. 18, 2016, the entire contents of which are hereby incorporated by reference.

FIELD OF THE INVENTION

The present disclosure generally relates to the field of display technology and, more particularly, relates to an array substrate, and a display panel including the array substrate.

BACKGROUND

With the development of display technology, the application of display panels becomes more and more broadened. As shown in FIG. 1, current RGBW display panels include four types of sub-pixels 01 (red, green, blue, and white) arranged alternatingly and repeatedly in the row direction, and all the sub-pixels 01 have the same aperture ratio. In the case of white sub-pixels, color filters are no longer needed, and formation of transparent filters are also often omitted to simplify the manufacturing process, thus allowing substantially all of the light through. Accordingly, the white sub-pixels can be much brighter than the RGB sub-pixels (the red, green, and blue sub-pixels). Thus, the RGBW display panels may provide enhanced overall brightness than the traditional RGB display panels.

However, when displaying a single-color image (e.g., a red, green, or blue image), the RGBW display panels provide a relatively lower brightness than the traditional RGB display panels. For example, if one fourth of the total area of the sub-pixels is occupied by the white sub-pixels, the brightness of the single-color image may be reduced by one fourth. Therefore, it has been a technical issue to be solved urgently in the RGBW display panels concerning the enhancement of light transmittance when displaying a single-color image, such that the display brightness of the single-color image may be improved.

The disclosed array substrate and display panel are directed to solving at least partial problems set forth above and other problems.

BRIEF SUMMARY OF THE DISCLOSURE

One aspect of the present disclosure provides an array substrate. The array substrate comprises a first substrate, a plurality of scanning lines and a plurality of data lines disposed on a first side of the first substrate, and a plurality of support structures disposed on the first side of the first substrate. The plurality of scanning lines and the plurality of data lines are insulated and intersected to define a plurality of sub-pixels including first sub-pixels, second sub-pixels, third sub-pixels, and fourth sub-pixels arranged alternatingly and repeatedly along a row direction. Along a column direction, the plurality of sub-pixels are divided into first sub-pixel columns containing the first sub-pixels and the third sub-pixels arranged alternatingly, and second sub-pixel columns containing the second sub-pixels and the fourth sub-pixels arranged alternatingly. A projection of a region where the fourth sub-pixel is located on the first substrate covers a projection of a support structure on the first substrate, and the row direction is different from the column direction.

Another aspect of the present disclosure provides a display panel. The display panel comprises an array substrate, a second substrate arranged opposite to the array substrate; and a liquid crystal layer sandwiched between the array substrate and the second substrate. The array substrate comprises a first substrate, a plurality of scanning lines and a plurality of data lines disposed on a first side of the first substrate, and a plurality of support structures disposed on the first side of the first substrate. The plurality of scanning lines and the plurality of data lines are insulated and intersected to define a plurality of sub-pixels including first sub-pixels, second sub-pixels, third sub-pixels, and fourth sub-pixels arranged alternatingly and repeatedly along a row direction. Along a column direction, the plurality of sub-pixels are divided into first sub-pixel columns containing the first sub-pixels and the third sub-pixels arranged alternatingly, and second sub-pixel columns containing the second sub-pixels and the fourth sub-pixels arranged alternatingly. A projection of a region where the fourth sub-pixel is located on the first substrate covers a projection of a support structure on the first substrate, and the row direction is different from the column direction.

Other aspects of the present disclosure can be understood by those skilled in the art in light of the description, the claims, and the drawings of the present disclosure.

BRIEF DESCRIPTION OF THE DRAWINGS

To make more clearly the explanation of technical solutions in embodiments of the present disclosure or current techniques, drawings needed in the embodiments or current techniques are briefly illustrated below. Apparently, the drawings described below only correspond to some embodiments of the present disclosure, and it is possible for those ordinarily skilled in the art to derive other drawings from the accompanying drawings without creative effort.

DETAILED DESCRIPTION

The technical solutions in the embodiments of the present disclosure will be described as follows with reference to the accompanying drawings. The embodiments described below are for illustrative purposes and do not constitute entire embodiments of the present disclosure. On the basis of the disclosed embodiments of the present disclosure, all other embodiments obtainable by those ordinarily skilled in the art without creative effort shall fall within the protection scope of the present disclosure.

Further, the present invention may be practiced in various forms other than the ones outlined herein, and those skilled in the art may realize similar embodiments without departing from the spirit of the present invention. Accordingly, the present invention will not be limited to the embodiments shown herein.

As discussed above, when displaying a single-color image (e.g., a red, green, or blue image), the RGBW display panels provide a relatively low brightness. Thus, the light transmittance of the RGBW display panels need to be enhanced when displaying a single-color image, such that the display brightness of the single-color image may be improved.

Directed to solving at least partial problems set forth above and other problems, the present disclosure provides an improved array substrate and a display panel including the array substrate. According to the present disclosure, support structures (e.g., photo spacers) are disposed on an array substrate to support and maintain a cell gap in a display panel. Specifically, the support structures are disposed in regions where white sub-pixels are located. Thus, while the areas of each sub-pixels remain the same, by disposing the support structures in regions where white sub-pixels are located instead of regions where other three types of sub-pixels are located, the feasible aperture ratios of the other three types of sub-pixels (e.g., blue, green, and red) are increased, and the light transmittance of the other three types of sub-pixels is enhanced. Accordingly, the display brightness of the display panel when displaying a single-color image is improved.

Figure 1:
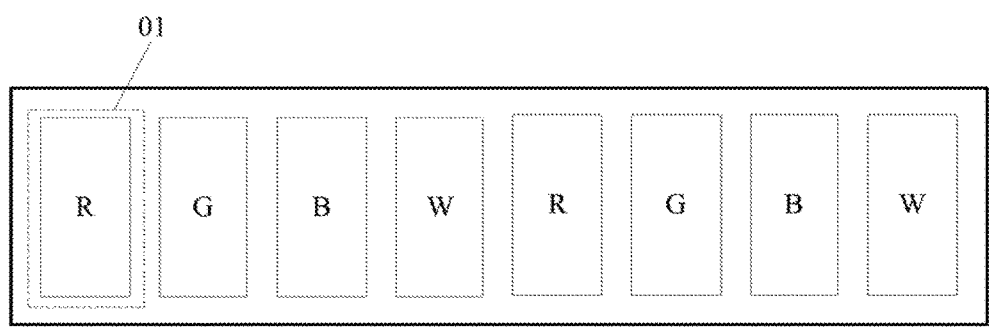
FIG. 1 illustrates a partial top view of an existing display panel.
Figure 2:
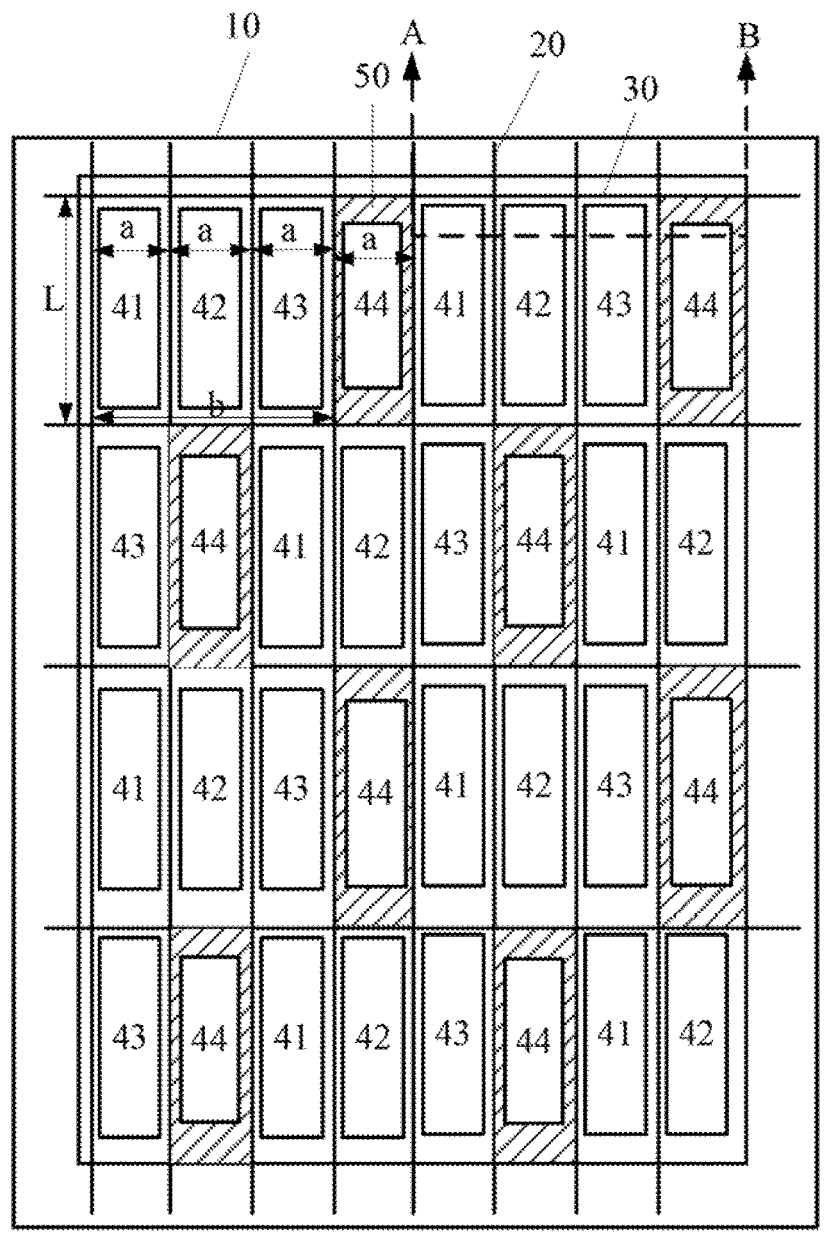
FIG. 2 illustrates a top view of an exemplary array substrate consistent with disclosed embodiments.
Figure 3:
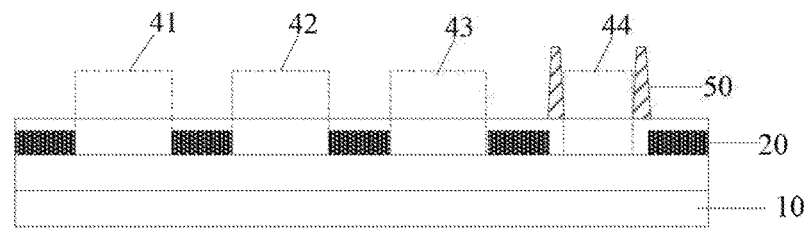
FIG. 3 illustrates an A-B cross-sectional view of an exemplary array substrate in FIG. 2 consistent with disclosed embodiments.

FIG. 2 illustrates a top view of an exemplary array substrate consistent with disclosed embodiments. FIG. 3 illustrates an A-B cross-sectional view of the exemplary array substrate in FIG. 2 consistent with disclosed embodiments. As shown in FIG. 2 and FIG. 3, the array substrate may include a first substrate 10, a plurality of data lines 20 and a plurality of scanning lines 30 disposed on a first side of the first substrate 10, and a plurality of support structures 50 disposed on a first side of the first substrate 10.

Specifically, as shown in FIG. 2, the plurality of data lines 20 and the plurality of scanning lines 30 may be insulated and intersected to define a plurality of sub-pixels. The plurality of sub-pixels may include first sub-pixels 41, second sub-pixels 42, third sub-pixels 43, and fourth sub-pixels 44 arranged alternatingly and repeatedly along the row direction. Projections of the fourth sub-pixels 44 on the first substrate 10 may cover projections of support structures 50 on the first substrate 10.

In one embodiment, one first sub-pixel 41, one second sub-pixel 42, and one third sub-pixel 43 arranged sequentially along the row direction may form a pixel group. The first sub-pixels 41 may be red sub-pixels, the second sub-pixels 42 may be green sub-pixels, and the third sub-pixels 43 may be blue sub-pixels. However, the present disclosure is not intended to limit the specific colors of the first sub-pixels 41, the second sub-pixels 42, and the third sub-pixels 43. For example, the first sub-pixels 41 may be green sub-pixels, the second sub-pixels 42 may be blue sub-pixels, and the third sub-pixels 43 may be red sub-pixels, as long as the sub-pixels in each pixel group have three different colors.

Further, the fourth sub-pixels 44 may be white sub-pixels. However, the present disclosure is not intended to limit the specific color of the fourth sub-pixels 44. For example, the fourth sub-pixels 44 may be yellow sub-pixels, green sub-pixels, or sub-pixels in other colors such as cyan.

Further, the pixel group may have a width b equal to the sum of widths of the first sub-pixel 41, the second sub-pixel 42, and the third sub-pixel 43. The length L of the pixel group may be equal to the length of each sub-pixel. Optionally, the first sub-pixel 41, the second sub-pixel 42, and the third sub-pixel 43 may have the same width a. Thus, the width a of each sub-pixel may be one third of the width b of the pixel group. Further, the width a of each sub-pixel may be one third of the length L of each sub-pixel, thus making the pixel group square-shaped. Optionally, the width of the fourth sub-pixel may also equal to a.

In the column direction, the plurality of sub-pixels may be divided into first sub-pixel columns including only the first sub-pixels 41 and the third sub-pixels 43, and second sub-pixel columns including only the second sub-pixels 42 and the fourth sub-pixels 44. Further, in the first sub-pixel columns, the first sub-pixels 41 and the third sub-pixels 43 may be arranged alternatingly along the column direction. Similarly, in the second sub-pixel columns, the second sub-pixels 42 and the fourth sub-pixels 44 may be arranged alternatingly along the column direction. The row direction may be different from the column direction, for example, the row direction may be perpendicular to the column direction.

In one embodiment, the row direction may be a direction parallel to an extension direction of the scanning lines 30, or may be a direction parallel to an extension direction of the data lines 20. As shown in FIG. 2, when the row direction is parallel to the extension direction of the scanning lines 30, the column direction may, optionally, be parallel to the extension direction of the data lines 20. In another embodiment, when the row direction is parallel to the extension direction of the data lines 20, the column direction may, optionally, be parallel to the extension direction of the scanning lines 30. The present disclosure is not intended to limit the specific row and column directions, depending on specific situations available.

Hereinafter, in the disclosed array substrate, the row direction may be configured to be parallel to the extension direction of the scanning lines 30, and the column direction may be configured to be parallel to the extension direction of the data lines 20.

As described above, in the disclosed array substrate, the projections of the fourth sub-pixels 44 on the first substrate 10 may cover the projections of the support structures 50 on the first substrate 10. That is, in the disclosed array substrate, each support structure 50 may be disposed in a region where a fourth sub-pixel 44 is located. Thus, while the areas of all sub-pixels remain the same, by disposing the support structures in regions where the fourth sub-pixels are located instead of regions where other three types of sub-pixels are located, the feasible aperture ratios of the other three types of sub-pixels (i.e., the first sub-pixels 41, the second sub-pixels 42, and the third sub-pixels 43) may be increased, and the light transmittance of the other three sub-pixels may be enhanced.

In one embodiment, the fourth sub-pixels 44 may be white sub-pixels. The white sub-pixels may have double or more times the brightness of colored sub-pixels (e.g., the red, green, and blue sub-pixels). Thus, in practical applications, the brightness of the white sub-pixels may be configured to be half of their maximum display brightness to avoid the occurrence of the excessive brightness phenomenon.

Specifically, in one embodiment, by disposing the support structures 50 in the regions where the white sub-pixels are located instead of regions where the other three types of sub-pixels are located, the aperture ratio of the white sub-pixels may be reduced, and the aperture ratios of the other three types of sub-pixels may be increased. Accordingly, the light transmittance (i.e., brightness) of the white sub-pixels may be reduced, and the light transmittance of the other three types of sub-pixels may be improved. Thus, the display brightness of the display panel comprising the disclosed array substrate when displaying a single-color image may be improved.

Further, because the white sub-pixels are much brighter than the other three sub-pixels, even if reduced, the brightness of the white sub-pixels may remain higher than the brightness of the other three types of sub-pixels. Accordingly, the display panel comprising the disclosed array substrate may show enhanced brightness than traditional RGB display panels.

Figure 4:
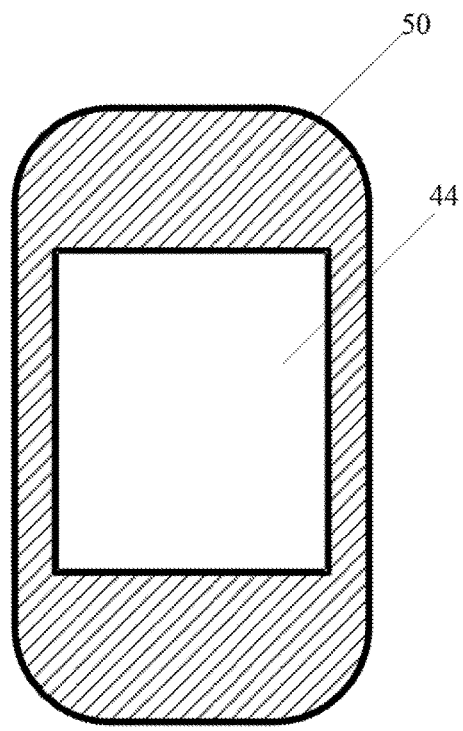
FIG. 4 illustrates a top view of a fourth sub-pixel and a support structure in a region where the fourth sub-pixel is in an exemplary array substrate consistent with disclosed embodiments.

FIG. 4 illustrates a top view of a fourth sub-pixel and a support structure in a region where a fourth sub-pixel is located in an exemplary array substrate consistent with disclosed embodiments. In one embodiment, in a plane parallel to the surface of the first substrate 10, the cross-sectional shape of the support structures 50 may be a rectangular frame with four rounded outside corners and four sharp rectangular inside corners, and the support structures 50 may each surround one fourth sub-pixel 44. Thus, the support structures 50 may have a supporting effect, the area occupied by the support structures 50 in the regions where the fourth sub-pixels 44 are located may be reduced, and the aperture ratio of the fourth sub-pixels 44 may be increased. In other embodiments, in the plane parallel to the surface of the first substrate 10, the cross-sectional shape of the support structure 50 may have other regular shapes (i.e., circular ring) or irregular shape, depending on the specific situations.

Figure 5:
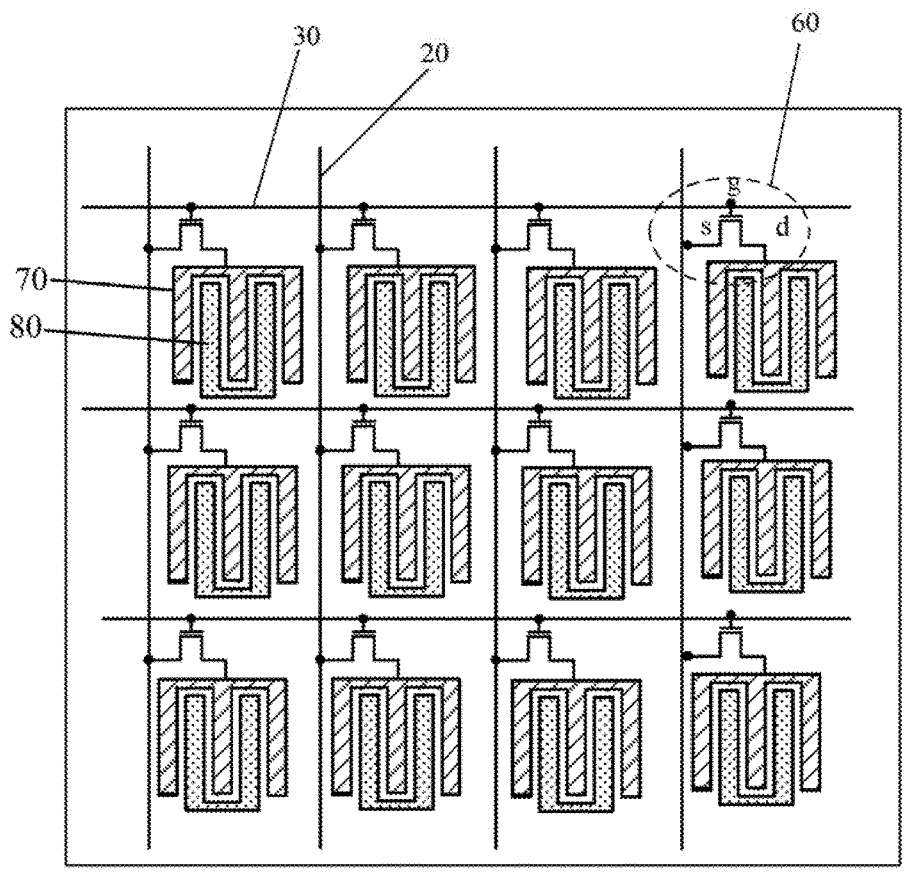
FIG. 5 illustrates a top view of each sub-pixel in an exemplary array substrate consistent with disclosed embodiments.
Figure 6:
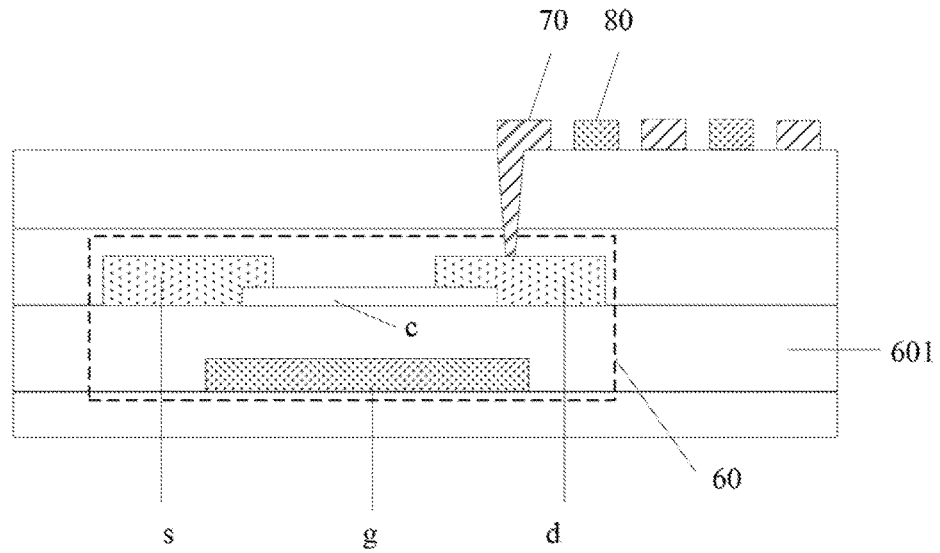
FIG. 6 illustrates a cross-sectional view of a sub-pixel in an exemplary array substrate in FIG. 5 consistent with disclosed embodiments.

FIG. 5 illustrates a top view of sub-pixels in an exemplary array substrate consistent with disclosed embodiments. FIG. 6 illustrates a cross-sectional view of a sub-pixel in FIG. 5 consistent with disclosed embodiments. In one embodiment, as shown in FIG. 5 and FIG. 6, each sub-pixel may include a thin film transistor 60, a pixel electrode 70, and a common electrode 80. In particular, each thin film transistor 60 may include a gate electrode g, a source electrode s, and a drain electrode d.

The plurality of data lines 20 and the plurality of scanning lines 30 may control the display of sub-pixels via the thin film transistors 60, and the thin film transistors 60 may each correspond to one sub-pixel. Specifically, as shown in FIG. 5, the gate electrode g of the thin film transistor 60 may be electrically connected to the scanning line 30, the source electrode s may be electrically connected to the data line 20, and the drain electrode d may be electrically connected to the pixel electrode 70 of the sub-pixel. The scanning line 30 may be configured to control the on-and-off of the thin film transistor 60. The data line 20 may be configured to, when the thin film transistor 60 is switched on, transmit a data signal to the drain electrode d of the thin film transistor 60, and further transmit the data signal to the pixel electrode 70 via the drain electrode d of the thin film transistor 60.

Further, referring to FIG. 6, in the sub-pixel, a channel region c may be disposed between the source electrode s of the thin film transistor 60 and the drain electrode d of the thin film transistor 60. The source electrode s made be made of a metal such as aluminum or copper. The drain electrode d may also be made of a metal such as aluminum or copper. The channel region c may be made of a semiconductor material, such as amorphous silicon, low temperature poly-silicon, a metal oxide, or a low temperature polycrystalline oxide, etc. Further, a gate insulation layer 601 may be disposed between the channel region c and the gate electrode g of the thin film transistor 60. The gate insulation layer 601 may be made of silicon nitride or silicon oxide, and the gate electrode g may be made of a metal such as aluminum or copper. Further, the channel region may be disposed above the gate electrode g of the thin film transistor 60.

Optionally, the source electrode s or drain electrode d of the thin film transistor 60 may have a thickness different from the thickness of the gate electrode g of the thin film transistor. Optionally, the source electrode s and the drain electrode d of the thin film transistor 60 may be thicker than the channel region c.

Further, the array substrate may further include common electrodes 80. In regions corresponding to each sub-pixel, the common electrodes 80 may be disposed on the same layer as the pixel electrodes 70. The common electrodes may be insulated from the pixel electrodes 70. Each common electrode 80 may be inter-digitated with a corresponding pixel electrode 70. Specifically, in one embodiment, as shown in FIG. 5, the common electrodes 80 may be comb-shaped. The pixel electrodes 70 may also be comb-shaped. The comb-shaped common electrodes 80 may each have a bar extending along the row direction and a plurality of comb-teeth extending along the column direction. Similarly, the pixel electrodes 70 may each have a bar extending along the row direction and a plurality of teeth extending along the column direction. Optionally, the common electrodes may each have three comb-teeth, and the pixel electrodes may each have two comb-teeth. The three comb-teeth of a common electrode may be inter-digitated with the two comb-teeth of a corresponding pixel electrode.

Further, the voltage signals at the common electrodes 80 corresponding to different sub-pixel may be the same. Specifically, in operation, after being switched on under control of the scanning line 30, the thin film transistor 60 may transmit the data signal carried by the data line 20 to the pixel electrode 70 via the drain electrode d of the thin film transistor 60. Thus, a controlling electric field may be formed between the pixel electrode 70 and the common electrode 80 to control the display of each sub-pixel.

Figure 7:
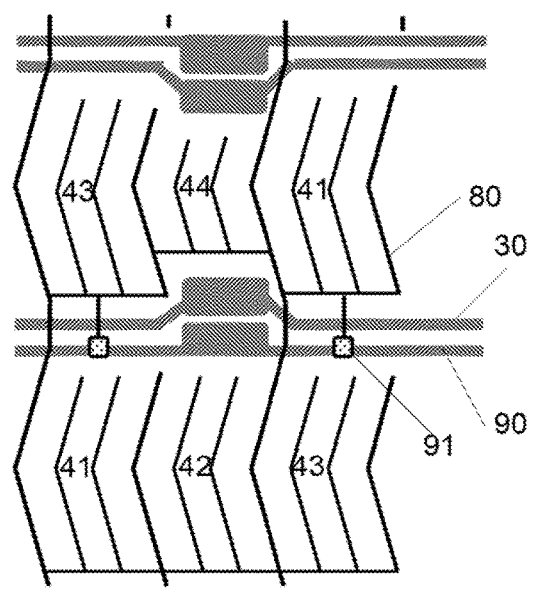
FIG. 7 illustrates electric connection of common electrodes corresponding to each sub-pixel in an exemplary array substrate consistent with disclosed embodiments.

FIG. 7 illustrates electric connection of common electrodes corresponding to each sub-pixel in an exemplary array substrate consistent with disclosed embodiments. In one embodiment, as shown in FIG. 7, the common electrodes 80 corresponding to the sub-pixels in the same row may be electrically connected and configured to receive a common electrode signal via a corresponding common electrode line 90. Optionally, the common electrode lines 90 and the scanning lines 30 may be disposed on the same layer, and the common electrodes 80 corresponding to the sub-pixels in the same row may be electrically connected to the same common electrode line 90 via second through-holes 91. However, the present disclosure is not limited thereto, depending on specific situations.

In one embodiment, as shown in FIG. 8-FIG. 11, the projections of fourth sub-pixels 44 on the first substrate may each cover the projection of one thin film transistor 60 on the first substrate. That is, the thin film transistors 60 each corresponding to one sub-pixel may be disposed in the regions where the fourth sub-pixels 44 are located. That is, the thin film transistors 60 may not be disposed in the regions where the other three types of sub-pixels are located. Accordingly, the feasible aperture ratios of the three other types of sub-pixels (i.e., the first sub-pixels 41, the second sub-pixels 42, and the third sub-pixels 43) may be increased, and the light transmittance of the three types of sub-pixels may be enhanced. Further, when displaying the single-color image, the display brightness and the overall aperture ratio of the display panel including the array substrate may be improved.

In one embodiment, the plurality of sub-pixels may be divided into a plurality of pixel units. Each pixel unit may include one fourth sub-pixel 44, and the thin film transistors 60 electrically connected to the sub-pixels in the same pixel unit may be disposed in the region where the one fourth sub-pixel 44 is located. Optionally, in one embodiment, each pixel unit may include one fourth sub-pixel 44, one third sub-pixel 43, one second sub-pixel 42, and one first sub-pixel 41, such that each pixel unit may display various colors.

Figure 8:
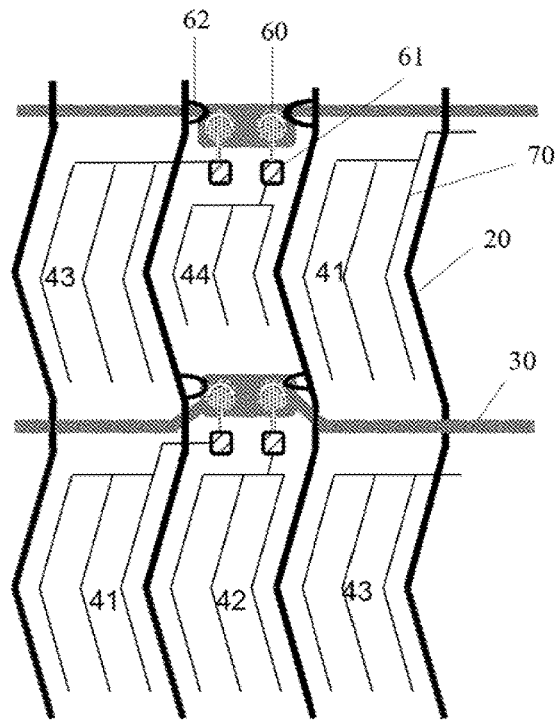
FIG. 8 illustrates electric connection of pixel electrodes corresponding to each sub-pixel in an exemplary array substrate consistent with disclosed embodiments.

FIG. 8 illustrates electric connection of pixel electrodes corresponding to each sub-pixel in an exemplary array substrate consistent with disclosed embodiments. In one embodiment, as shown in FIG. 8, the pixel unit may include one fourth sub-pixel 44, one third sub-pixel 43 adjacent to the fourth sub-pixel 44 in the row direction, one second sub-pixel 42 adjacent to the fourth sub-pixel 44 in the column direction, and one first sub-pixel 41 adjacent to the one third sub-pixel 43 in the column direction.

Further, referring to FIG. 8, in one embodiment, the drain electrode of the thin film transistor 60 may be electrically connected to the pixel electrode 70 of the sub-pixel via a first through-hole 61, and the source electrode of the thin film transistor 60 may be electrically connected to the data line 20 via a second through-hole 62.

Optionally, referring to FIG. 8, in the plane parallel to the first substrate, the cross-sectional shape of the second through-hole 62 may be an arc. That is, the second through-hole 62 may be designed to be hollow, thus reducing the overlap capacitance between the scanning line 30 and the second through-hole 62, and reducing the overlap capacitance between the scanning line 30 and the data line 20. However, the present disclosure is not intended to limit the cross-sectional shape of the second through-hole 62 in the plane parallel to the first substrate.

Figure 9:
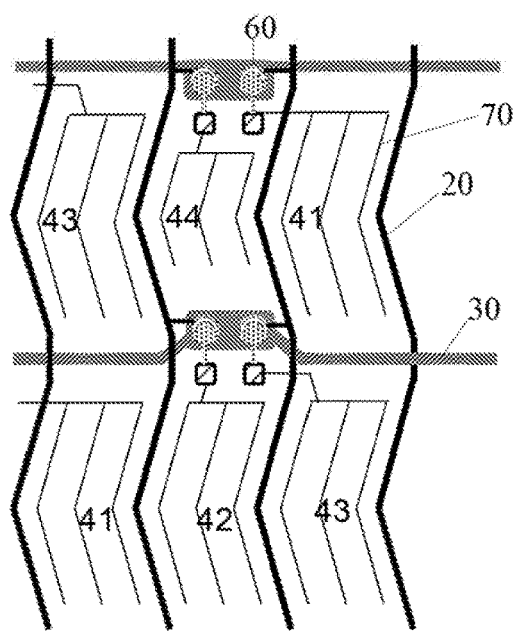
FIG. 9 illustrates electric connection of pixel electrodes corresponding to each sub-pixel in another exemplary array substrate consistent with disclosed embodiments.

FIG. 9 illustrates electric connection of pixel electrodes corresponding to each sub-pixel in another exemplary array substrate consistent with disclosed embodiments. In one embodiment, as shown in FIG. 9, the pixel unit may include one fourth sub-pixel 44, one first sub-pixel 41 adjacent to the fourth sub-pixel 44 in the row direction, one second sub-pixel 42 adjacent to the fourth sub-pixel 44 in the column direction, and one third sub-pixel 43 adjacent to the one first sub-pixel 41 in the column direction.

In some other embodiments, the pixel unit may only include certain types of sub-pixels selected from the first sub-pixels 41, the second sub-pixels 42, the third sub-pixels 43, and the fourth sub-pixels 44. The present disclosure is not intended to limit the types, the number, and the electric connection of the sub-pixels included in each pixel unit.

Figure 10:
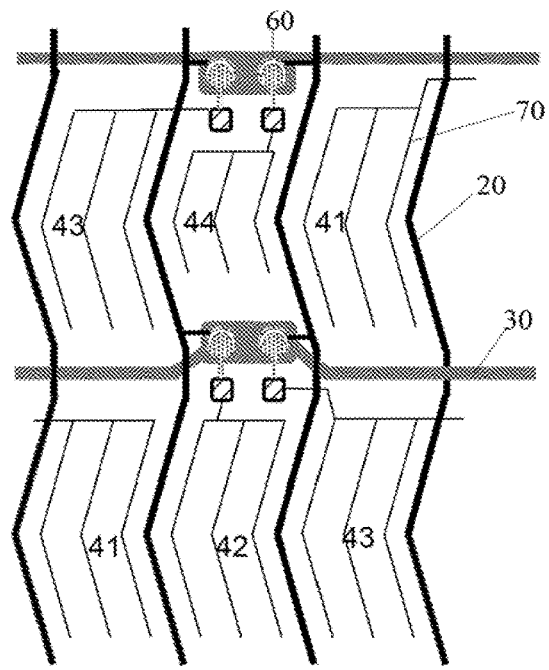
FIG. 10 illustrates electric connection of pixel electrodes corresponding to each sub-pixel in another exemplary array substrate consistent with disclosed embodiments.

FIG. 10 illustrates electric connection of pixel electrodes corresponding to each sub-pixel in another exemplary array substrate consistent with disclosed embodiments. In one embodiment, as shown in FIG. 10, the pixel unit may include one fourth sub-pixel 44, one third sub-pixel 43 adjacent to the fourth sub-pixel 44 in the row direction, one second sub-pixel 42 adjacent to the fourth sub-pixel 44 in the column direction, and one third sub-pixel 43 adjacent to the second sub-pixel 42 in the row direction.

Figure 11:
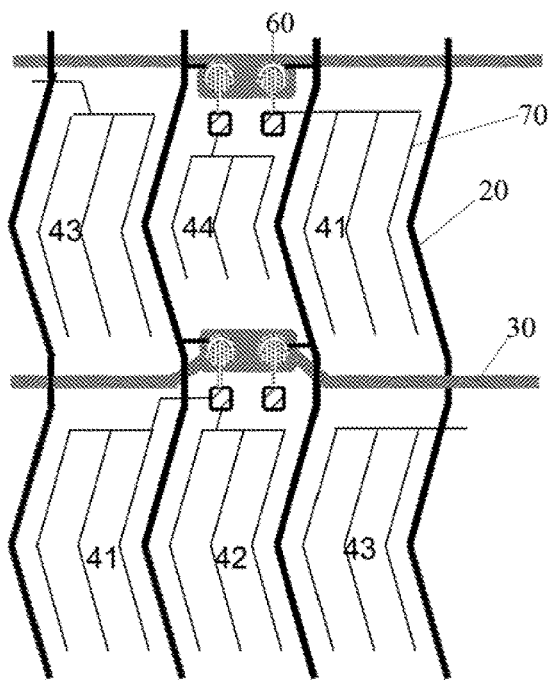
FIG. 11 illustrates electric connection of pixel electrodes corresponding to each sub-pixel in another exemplary array substrate consistent with disclosed embodiments.

FIG. 11 illustrates electric connection of pixel electrodes corresponding to each sub-pixel in another exemplary array substrate consistent with disclosed embodiments. In one embodiment, as shown in FIG. 11, the pixel unit may include one fourth sub-pixel 44, one first sub-pixel 41 adjacent to the fourth sub-pixel 44, one second sub-pixel 42 adjacent to the fourth sub-pixel 44 in the column direction, and one first sub-pixel 41 adjacent to the second sub-pixel 42 in the row direction.

Figure 12:
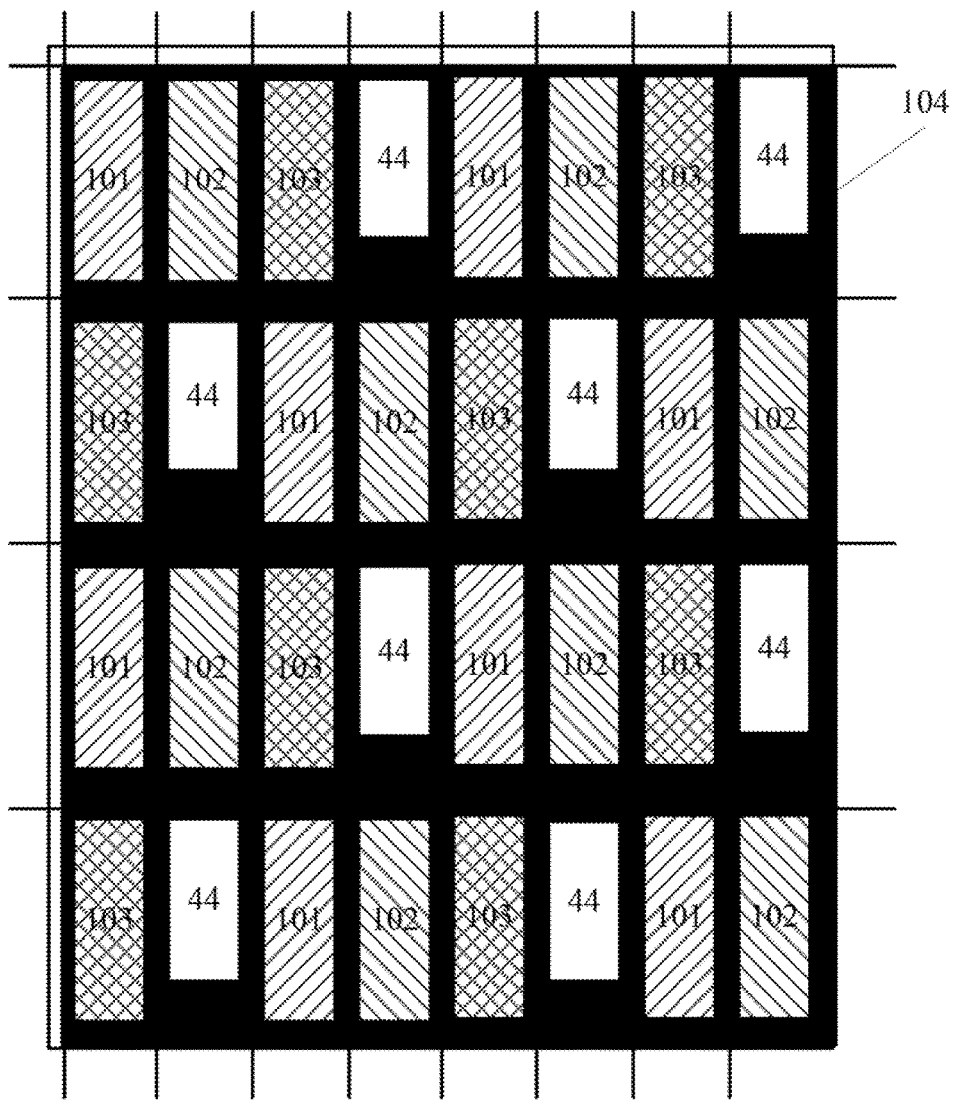
FIG. 12 illustrates a top view of a color filter layer and each sub-pixel in an exemplary array substrate consistent with disclosed embodiments.
Figure 13:
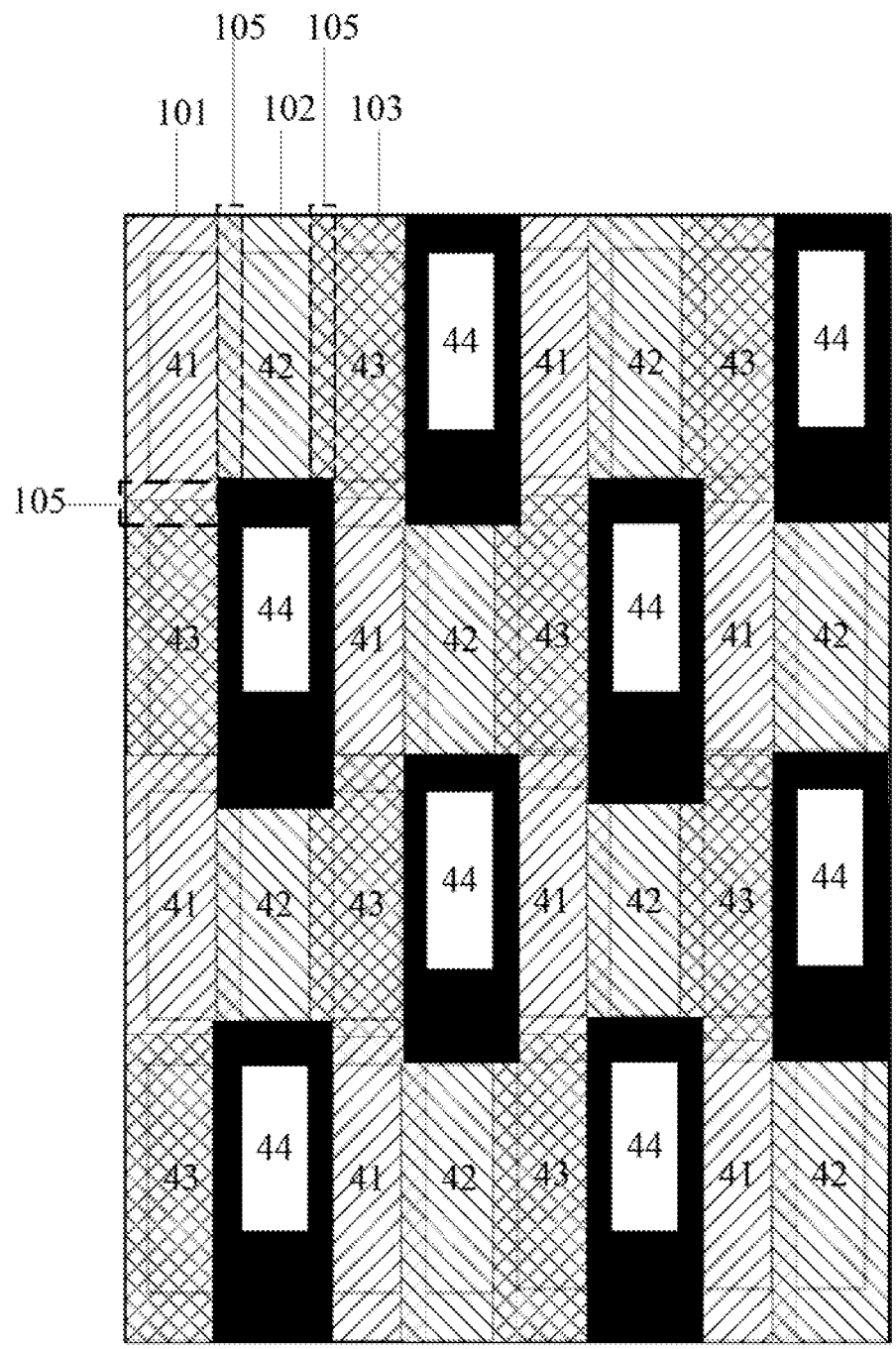
FIG. 13 illustrates a top view of a color filter layer and each sub-pixel in another exemplary array substrate consistent with disclosed embodiments.
Figure 14:
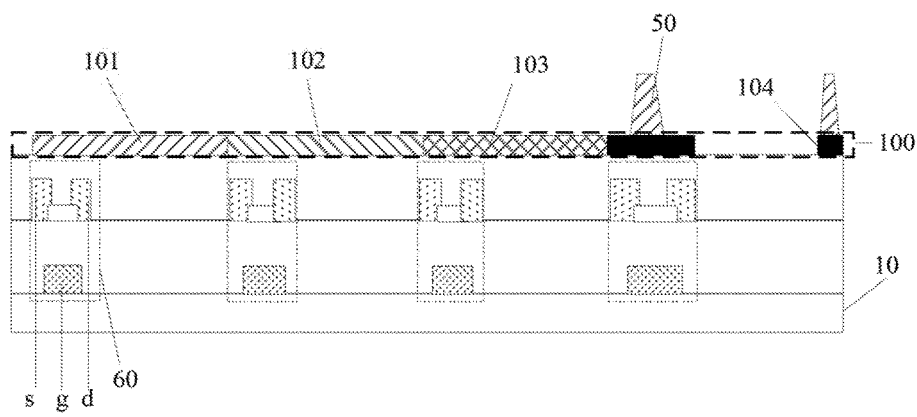
FIG. 14 illustrates a cross-sectional view of an array substrate including a color filter layer consistent with disclosed embodiments.

FIG. 12 illustrates a top view of a color filter layer and sub-pixels in an exemplary array substrate consistent with disclosed embodiments. FIG. 13 illustrates a top view of a color filter layer and sub-pixels in another exemplary array substrate consistent with disclosed embodiments. FIG. 14 illustrates a cross-sectional view of an array substrate including a color filter layer consistent with disclosed embodiments. In one embodiment, as shown in FIG. 14, the array substrate may also include a color filter layer 100 disposed on the first side of the first substrate 10. The color filter layer 100 may include first color filters 101, second color filters 102, third color filters 103 and a light-shielding structure (e.g., a black matrix) 104.

Specifically, the first color filters 101 may correspond to the first sub-pixels 41. The second color filters 102 may correspond to the second sub-pixels 42. The third color filters may correspond to the third sub-pixels 43. In one embodiment, the first color filters 101 may be red color filters, the second color filters 102 may be green color filters, and the third color filters 103 may be blue color filters. However, the present disclosure is not intended to limit the specific colors of the first color filter 101, the second color filters 102, and the third color filters 103.

Further, the thickness of the first color filter 101, the thickness of the second color filter 102, and the thickness of the third color filter 103 may be the same, partially the same, or may be different. Optionally, the thickness of a color filter selected from the first color filter 101, the second color filter 102 and the third color filter 103 may be three times the thickness of a corresponding sub-pixel (one of the first sub-pixel 41, the second sub-pixel 42, and the third sub-pixel 43).

Further, the light-shielding structure 104 may at least cover non-transparent regions between each fourth sub-pixel 44 and a corresponding first sub-pixel 41, non-transparent regions between each fourth sub-pixel 44 and a corresponding second sub-pixel 42, and non-transparent regions between each fourth sub-pixel 44 and a corresponding third sub-pixel 43.

In one embodiment, as shown in FIG. 12, the light-shielding structure 104 may cover non-transparent regions between any two sub-pixels selected from the first sub-pixel 41, the second sub-pixel 42, the third sub-pixel 43, and the fourth sub-pixel 44. That is, the first color filters 101 may only cover the regions corresponding to the first sub-pixels 41, the second color filters 102 may only cover the regions corresponding to the second sub-pixels 42, the third color filters 103 may only cover the regions corresponding to the third sub-pixels 43, and the rest regions may all be covered by the light-shielding structure 104.

In another embodiment, as shown in FIG. 13, the light-shielding structure 104 may only cover the non-transparent regions between each fourth sub-pixel 44 and a corresponding first sub-pixel 41, the non-transparent regions between each fourth sub-pixel 44 and corresponding second sub-pixels 42, and the non-transparent regions between each fourth sub-pixel 44 and a corresponding third sub-pixel 43. Thus, the area of the light-shielding structure 104 may be decreased, and the cost of fabricating the light-shielding structure 104 may be reduced.

In one embodiment, any two sub-pixels in different colors selected from the first color filter 101, the second color filter 102, and the third color filter 103 may have an overlapping region 105. The overlapping region 105 may cover the non-transparent region between any two sub-pixels selected from the first sub-pixel 41, the second sub-pixel 42, and the third sub-pixel 43.

Specifically, the overlapping region between the first color filter 101 and the second color filter 102 may cover the non-transparent region between the first sub-pixel 41 and the second sub-pixel 42. The overlapping region between the first color filter 101 and the third color filter 103 may cover the non-transparent region between the first sub-pixel 41 and the third sub-pixel 43. The overlapping region between the second color filter 102 and the third color filter 103 may cover the non-transparent region between the second sub-pixel 42 and the third sub-pixel 43.

In one embodiment, as shown in FIG. 14, the color filter layer 100 may be disposed on one side of the thin film transistors 60 facing away the first substrate 10, and each support structure 50 may be disposed on the light-shielding structure 104 facing away the first substrate 10.

Figure 15:
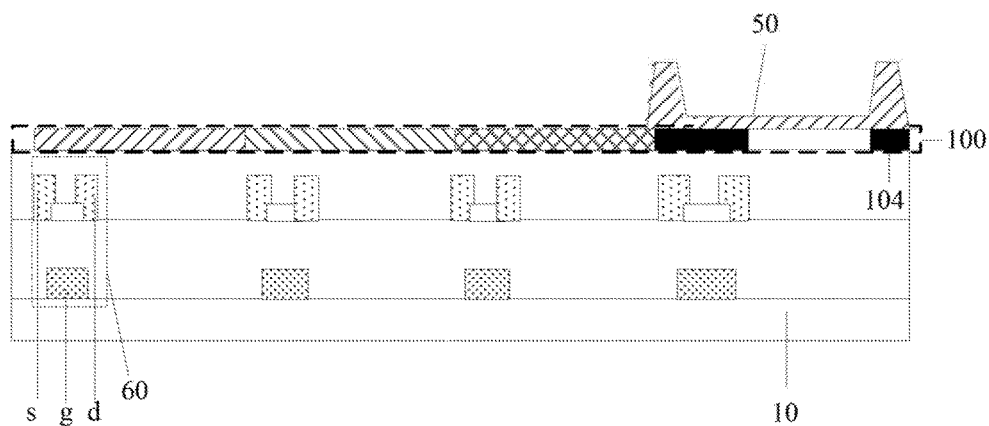
FIG. 15 illustrates a cross-sectional view of an exemplary array substrate consistent with disclosed embodiments.

Optionally, in one embodiment, as shown in FIG. 14, the projections of the light-shielding structures 104 on the first substrate 10 may each cover a projection of one support structure 50 on the first substrate 10. FIG. 15 illustrates a cross-sectional view of an exemplary array substrate consistent with disclosed embodiments. In one embodiment, as shown in FIG. 15, the projections of the support structures 50 on the first substrate 10 may each cover projections of one fourth sub-pixel 44 and the light-shielding structure 104 corresponding to the support structure 50 on the first substrate 10. In one embodiment, the support structure 50 may be a colorless and transparent support structure, thus avoiding the influence of the support structure 50 on the display color of the region where the fourth sub-pixel 44 is located.

Figure 16:
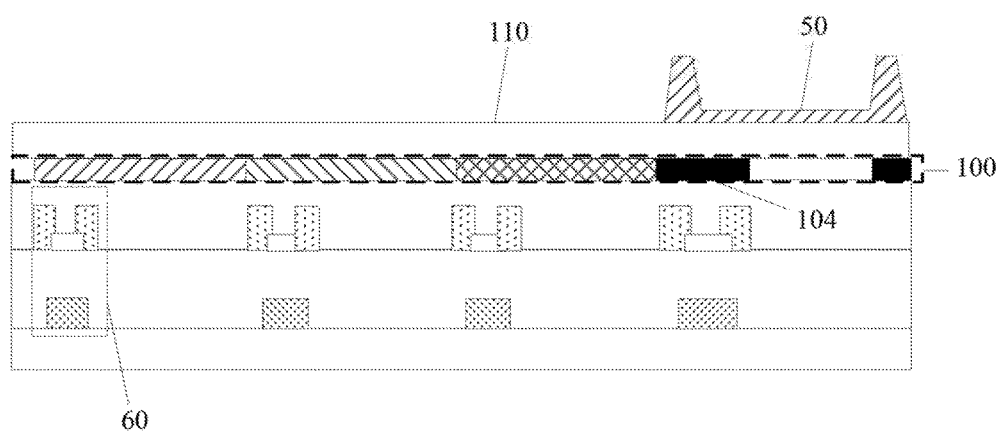
FIG. 16 illustrates a cross-sectional view of another exemplary array substrate consistent with disclosed embodiments.

In one embodiment, FIG. 16 illustrates a cross-sectional view of another exemplary array substrate consistent with disclosed embodiments. As shown in FIG. 16, an organic film layer 110 such as a passivation layer may be disposed between the light-shielding structure 104 and the support structure 50. That is, the organic film layer 110 may be disposed between the color filter layer 100 and the support structure 50.

Figure 17:
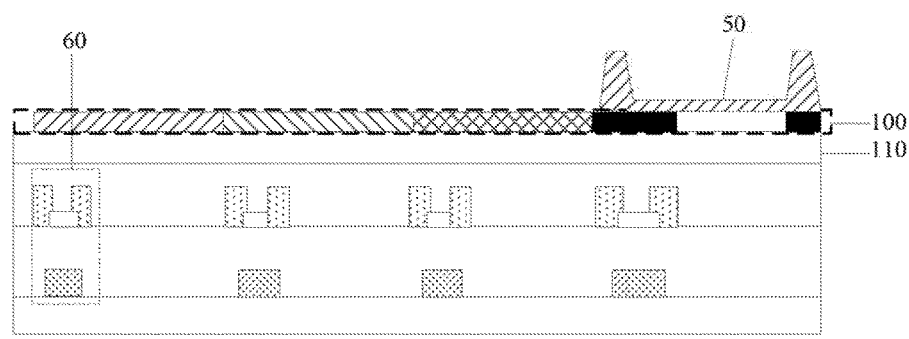
FIG. 17 illustrates a cross-sectional view of another exemplary array substrate consistent with disclosed embodiments.

In another embodiment, FIG. 17 illustrates a cross-sectional view of another exemplary array substrate consistent with disclosed embodiments. As shown in FIG. 17, the organic film layer 110 may be disposed between the color filter layer 100 and the thin film transistors 60. In other embodiments, the organic film layer 110 may be disposed in other locations. The present disclosure is not intended to limit the specific location of the organic film layer 110.

Figure 18:
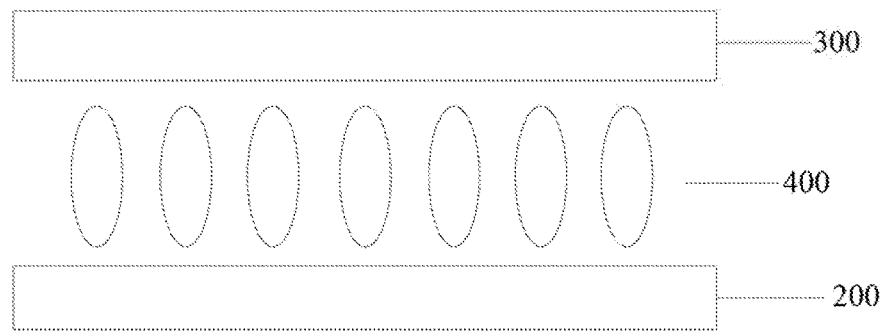
FIG. 18 illustrates a cross-sectional view of an exemplary display panel consistent with disclosed embodiments.

Further, the present disclosure also provides a display panel. FIG. 18 illustrates a cross-sectional view of an exemplary display panel consistent with disclosed embodiments. As shown in FIG. 18, the display panel may include an array substrate 200 according to any above-described embodiment, a second substrate 300 arranged opposite to the array substrate 200, and a liquid crystal layer 400 sandwiched between the array substrate 200 and the second substrate 300.

In conclusion, the disclosed array substrate and the display panel including the array substrate may include a plurality of data lines and a plurality of scanning lines disposed on a first side of the first substrate, and a plurality of support structures disposed on the first side of the first substrate. In particular, the plurality of data lines and the plurality of scanning lines may be insulated and intersected to define a plurality of sub-pixels. The plurality of sub-pixels may include first sub-pixels, second sub-pixels, third sub-pixels, and fourth sub-pixels arranged periodically along the row direction. The projections of the regions where the fourth sub-pixels are located may cover the projections of support structures on the first substrate. The fourth sub-pixels may be white sub-pixels.

In the disclosed array substrate, each support structure may be disposed in the region where a white sub-pixel is located. Thus, while the areas of all sub-pixels remain the same, by disposing the support structures in regions where white sub-pixels are located instead of regions where other three types of sub-pixels are located, the feasible aperture ratios of three other types of sub-pixels (i.e., the first sub-pixels, the second sub-pixels, and the third sub-pixels) may be increased, and the light transmittance of the three types of sub-pixels may be enhanced. Simultaneously, the feasible aperture ratios of the white sub-pixels may be reduced, and the light transmittance of the white sub-pixels may be reduced. Accordingly, the display brightness of the display panel when displaying a single-color image may be improved.

Various embodiments of the specification are described in a progressive way, each embodiment highlights its difference from other embodiments, and the same or similar parts between the various embodiments may be referred to each other.

The above descriptions of the disclosed embodiments are presented to enable any person skilled in the art to make or use the invention. Various modifications to the disclosed embodiments will be readily apparent to those skilled in the art, and the general principles defined herein may be applied to other embodiments without departing from the spirit and scope of the present disclosure. Thus, the present disclosure is not limited to the embodiments shown, but is to be accorded the widest scope consistent with the principles and novel features herein disclosed.

What is claimed is:

1. An array substrate, comprising:
a first substrate;
a plurality of scanning lines and a plurality of data lines disposed on a first side of the first substrate, the plurality of scanning lines and the plurality of data lines being insulated and intersected to define a plurality of sub-pixels; and
a plurality of support structures disposed on the first side of the first substrate,
wherein the plurality of sub-pixels include first sub-pixels, second sub-pixels, third sub-pixels, and fourth sub-pixels arranged alternatingly and repeatedly along a row direction,
along a column direction, the plurality of sub-pixels are divided into first sub-pixel columns containing the first sub-pixels and the third sub-pixels arranged alternatingly, and second sub-pixel columns containing the second sub-pixels and the fourth sub-pixels arranged alternatingly,
a projection of a region where the fourth sub-pixel is located on the first substrate entirely covers a projection of a support structure on the first substrate, such that the support structures do not overlap with the first sub-pixels, the second sub-pixels, or the third sub-pixels, and
the row direction is different from the column direction, wherein the array substrate further includes:
a color filter layer disposed on the first side of the first substrate, the color filter layer including first color filters, second color filters, third color filters, and a light-shielding structure,
wherein the first color filters correspond to the first sub-pixels, the second color filters correspond to the second sub-pixels, the third color filters correspond to the third sub-pixels, and
the light-shielding structure at least covers non-transparent regions between each fourth sub-pixel and a corresponding first sub-pixel, non-transparent regions between each fourth sub-pixel and corresponding second sub-pixel, and non-transparent regions between each fourth sub-pixel and a corresponding third sub-pixel.

2. The array substrate according to claim 1, wherein:
the fourth sub-pixels are white sub-pixels.

3. The array substrate according to claim 1, wherein:
the plurality of data lines and the plurality of scanning lines control display of each sub-pixel via thin film transistors, each thin film transistor corresponds to one sub-pixel,
a gate electrode of the thin film transistor is electrically connected to a scanning line, a source electrode of the thin film transistor is electrically connected to a data line, and a drain electrode of the thin film transistor is electrically connected to a pixel electrode of the sub-pixel, and
under control of the scanning line, a data signal carried by the data line is transmitted to the pixel electrode, thus controlling display of the sub-pixel.

4. The array substrate according to claim 3, wherein:
projections of regions where the fourth sub-pixels are located on the first substrate each covers a projection of a thin film transistor on the first substrate.

5. The array substrate according to claim 4, wherein:
the plurality of sub-pixels is divided into a plurality of pixel units,
each pixel unit includes one fourth sub-pixel, and
the thin film transistors electrically connected to sub-pixels in a same pixel unit are located in a region where a fourth sub-pixel is located in the pixel unit.

6. The array substrate according to claim 5, wherein:
the pixel unit includes one fourth sub-pixel, one third sub-pixel adjacent to the fourth sub-pixel in the row direction, one second sub-pixel adjacent to the fourth sub-pixel in the column direction, and one first sub-pixel adjacent to the one third sub-pixel in the column direction.

7. The array substrate according to claim 5, wherein:
the pixel unit includes one fourth sub-pixel, one first sub-pixel adjacent to the fourth sub-pixel in the row direction, one second sub-pixel adjacent to the fourth sub-pixel in the column direction, and one third sub-pixel adjacent to the one second sub-pixel in the row direction.

8. The array substrate according to claim 5, wherein:
the pixel unit includes one fourth sub-pixel, one third sub-pixel adjacent to the fourth sub-pixel in the row direction, one second sub-pixel adjacent to the fourth sub-pixel in the column direction, and one first sub-pixel adjacent to the one second sub-pixel in the row direction.

9. The array substrate according to claim 5, wherein:
the pixel unit includes one fourth sub-pixel, one first sub-pixel adjacent to the fourth sub-pixel in the row direction, one second sub-pixel adjacent to the fourth sub-pixel in the column direction, and one third sub-pixel adjacent to the one second sub-pixel in the row direction.

10. The array substrate according to claim 3, further comprising:
common electrodes disposed on a same layer as the pixel electrodes in regions corresponding to each sub-pixel, each common electrode being inter-digitated with one pixel electrode,
wherein common electrodes corresponding to a same row of sub-pixels are electrically connected and configured to receive a common electrode signal via a common electrode line.

11. The array substrate according to claim 3, wherein:
the drain electrode of the thin film transistor is electrically connected to the pixel electrode of the sub-pixel via a first through-hole;
the drain electrode of the thin film transistor electrically connected to the pixel electrode of the fourth sub-pixel passes through a first first through-hole on the fourth sub-pixel; and
the drain electrode of the thin film transistor electrically connected to the pixel electrode of any one of the first sub-pixel, the second sub-pixel, and the third sub-pixel passes through a second first through-hole on the corresponding fourth sub-pixel.

12. The array substrate according to claim 11, wherein:
the source electrode of the thin film transistor is electrically connected to the data line via a second through-hole, and in the plane parallel to the first substrate, a cross-sectional shape of the second through-hole is an arc.

13. The array substrate according to claim 1, wherein:
a thickness of the first color filters is three times of a thickness of the first sub-pixels;
a thickness of the second color filters is three times of a thickness of the second sub-pixels; and
a thickness of the third color filters is three times of a thickness of the third sub-pixels.

14. The array substrate according to claim 1, wherein:
the light-shielding structure covers non-transparent regions between any two sub-pixels selected from the first sub-pixel, the second sub-pixel, the third sub-pixel, and the fourth sub-pixel.

15. The array substrate according to claim 1, wherein:
the light-shielding structure only covers the non-transparent region between each fourth sub-pixel and the corresponding first sub-pixel, the non-transparent region between each fourth sub-pixel and the corresponding second sub-pixels, and the non-transparent region between each fourth sub-pixel and the corresponding third sub-pixel,
an overlapping region exists between any two color filters in different colors selected from the first color filter, the second color filter, and the third color filter, and
the overlapping regions cover the non-transparent regions between any two sub-pixels selected from the first sub-pixel, the second sub-pixel, and the third sub-pixel.

16. The array substrate according to claim 1, wherein:
the color filter layer is disposed on one side of the first substrate facing away the thin film transistors, and the support structures are disposed on one side of the shielding structure facing away the first substrate.

17. The array substrate according to claim 16, wherein:
the projection of the support structure on the first substrate covers projections of the fourth sub-pixel and the light-shielding structure corresponding to the support structure on the first substrate.

18. The array substrate according to claim 1, wherein:
the row direction is parallel to an extension direction of the scanning lines, and the column direction is parallel to an extension direction of the data lines.

19. The array substrate according to claim 18, wherein:
a width of the sub-pixel along the row direction is ⅓ of a length of the sub-pixel along the column direction.

20. A display panel, comprising:
an array substrate;
a second substrate arranged opposite to the array substrate; and
a liquid crystal layer sandwiched between the array substrate and the second substrate,
wherein the array substrate comprises a first substrate, a plurality of scanning lines and a plurality of data lines disposed on a first side of the first substrate, and a plurality of support structures disposed on the first side of the first substrate,
the plurality of scanning lines and the plurality of data lines are insulated and intersected to define a plurality of sub-pixels,
the plurality of sub-pixels include first sub-pixels, second sub-pixels, third sub-pixels, and fourth sub-pixels arranged alternatingly and repeatedly along a row direction,
along a column direction, the plurality of sub-pixels are divided into first sub-pixel columns containing the first sub-pixels and the third sub-pixels arranged alternatingly, and second sub-pixel columns containing the second sub-pixels and the fourth sub-pixels arranged alternatingly,
a projection of a region where the fourth sub-pixel is located on the first substrate entirely covers a projection of a support structure on the first substrate, such that the support structures do not overlap with the first sub-pixels, the second sub-pixels, or the third sub-pixels, and
the row direction is different from the column direction, wherein the array substrate further includes:
a color filter layer disposed on the first side of the first substrate, the color filter layer including first color filters, second color filters, third color filters, and a light-shielding structure,
wherein the first color filters correspond to the first sub-pixels, the second color filters correspond to the second sub-pixels, the third color filters correspond to the third sub-pixels, and
the light-shielding structure at least covers non-transparent regions between each fourth sub-pixel and a corresponding first sub-pixel, non-transparent regions between each fourth sub-pixel and corresponding second sub-pixel, and non-transparent regions between each fourth sub-pixel and a corresponding third sub-pixel.

* * * * *